F. G. REID AND W. B. ALLISON.
DISK WHEEL CONSTRUCTION.
APPLICATION FILED MAR. 30, 1921.
1,412,218.
Patented Apr. 11, 1922.
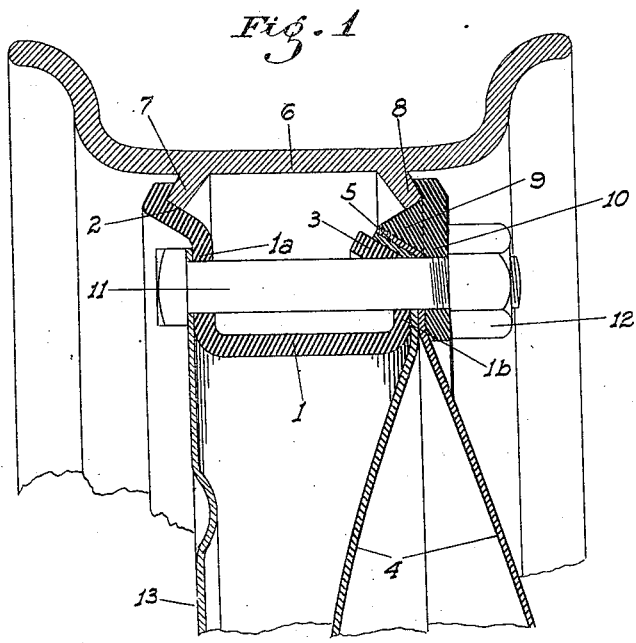
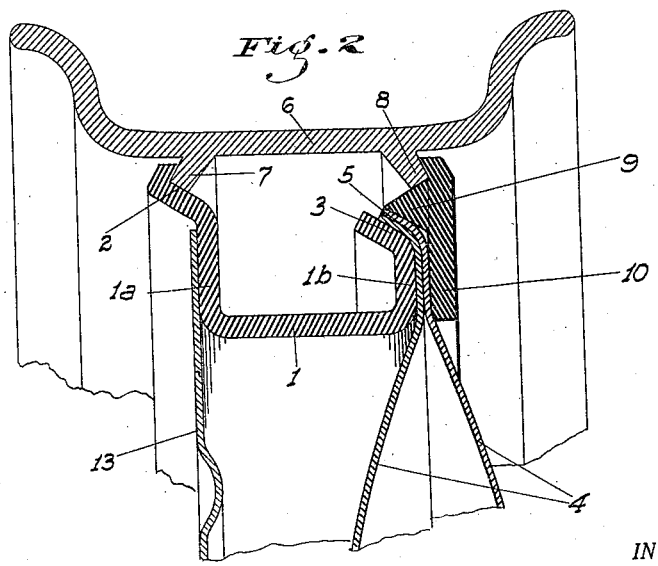
INVENTORS
Frederick G. Reid and
Walter B. Allison
BY _____ ATTORNEY

UNITED STATES PATENT OFFICE.

FREDERICK G. REID AND WALTER B. ALLISON, OF BUFFALO, NEW YORK, ASSIGNORS TO HARVEY RIM & WHEEL COMPANY, INC., OF BUFFALO, NEW YORK.

DISK-WHEEL CONSTRUCTION.

1,412,218. Specification of Letters Patent. Patented Apr. 11, 1922.

Application filed March 30, 1921. Serial No. 456,829.

*To all whom it may concern:*

Be it known that we, FREDERICK G. REID, a citizen of the Dominion of Canada, and WALTER B. ALLISON, citizen of the United States, both residing at Buffalo, county of Erie, State of New York, have invented certain new and useful Improvements in Disk-Wheel Construction; and we do declare the following to be a full, clear, and exact description of the same, reference being had to the accompanying drawings, and to the characters of reference marked thereon, which form a part of this application.

This invention relates to improvements in vehicle wheels employing solid metal disks instead of spokes, and being also adapted to carry demountable rims for pneumatic tires.

The principal object of our invention is to provide a method of securing the disks to the fixed rim of the wheel so that the rim and disks will be positively supported and held relative to each other, a locking ring for the demountable rim being also provided and designed to co-operate with the fixed rim and disks in such a manner that a clamping of the latter in place is had, so that a very substantial and rigidly connected structure is thereby obtained, from which all possibility of relative radial movement is eliminated.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Fig. 1 is a cross section through the rims, and one of the locking-ring securing bolts, Fig. 2 is a similar view taken intermediate of said bolts.

Referring now more particularly to the characters of reference on the drawings, the numeral 1 denotes the fixed rim in general, being preferably a channel shaped member with the opening facing outwardly. One side $1^a$ of the rim is formed with a transversely disposed groove 2 adjacent its outer periphery and facing toward the opposite side $1^b$ of the rim. Said opposite side is of lesser diameter than the grooved side and is bent theretoward as at 3 making an obtuse angle of about 120° with the side $1^b$ of which it is a portion, and practically forming a beveled face on said rim, the apex of said angle being eliminated by a curve, to do away with any direct angular corners.

The main disks 4 of the wheel lie against the outer face of the side $1^b$, and then follow and overlap the bent portion 3 thereof as at 5 being welded thereto all around or at as many points as may be found desirable. In this manner, regardless of the strength of the welding, the disks and rim are positively held against relative radial movement.

The disks themselves are also strengthened or braced by reason of the circumferential bent portions. We preferably employ the same arrangement of disks as shown in Patent No. 1,307,005, for instance, but the intermediate disk may of course be omitted without changing the remainder of the structure.

A demountable rim 6 is provided to be used with the fixed rim and has a flange 7 on its inner face adapted to fit the groove 2.

A similar flange 8 is formed with the rim 6 and on the inner face thereof but is oppositely disposed to the flange 7 and is adapted to be engaged by the outer face of a wedge ring 9, the inner face of which bears against the bent portion 5 of the outer disk, and which is formed integral with or secured to a flat ring 10, which extends beyond the wedge both outwardly and inwardly, the former extension being in order to form a stop for the flange 8 and the latter to lie against the outer disk 4 in alinement with the straight side $1^b$ of the fixed rim, there being bolts 11 disposed at certain intervals which project through the fixed rim sides, the disks, and ring 10, with of course nuts 12 thereon outside the latter.

An inner disk 13 is also employed but has no special features, being merely welded to the side $1^a$ of the rim 1.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent, is:—

1. In disk wheel construction, a fixed rim the outer face and one side of said rim having a beveled portion formed therewith, and a disk extending to and lying against the said side of the rim and being bent to also lie against the beveled portion of said rim, and a locking ring for a demountable rim provided with a wedge shaped portion, one face of said portion being adapted to bear against the bent portion of the disk and the other against the demountable rim.

2. In disk wheel construction, a fixed rim the outer face and one side of said rim having a beveled portion formed therewith, a disk lying against the said side of the rim and being bent to also lie against the beveled portion of the rim and being fixed thereto, a locking ring for a demountable rim provided with a beveled face adapted to bear on the bent portion of the disk and with a straight portion adapted to bear against that portion of the disk which lies against the side of the fixed rim.

3. In disk wheel construction, a fixed rim the outer face and one side of said rim having a beveled portion formed therewith, a disk lying against the said side of the rim and being bent to also lie against the beveled portion of the rim and being fixed thereto, a locking ring for a demountable rim provided with a beveled face adapted to bear on the bent portion of the disk and with a straight portion adapted to bear against that portion of the disk which lies against the side of the fixed rim, and means for holding and clamping said locking rim in position and against the disk surfaces and demountable rim.

4. In a disk wheel construction, a fixed rim having a beveled portion formed on one side thereof adjacent the outer face, a disk extending to and lying against said side and beveled portion of the rim, and an endless locking ring for a demountable rim having an endless wedge shaped portion adapted to pass between the demountable rim and the bent face of the disk and to bear thereagainst throughout its extent.

In testimony whereof we affix our signatures.

FREDERICK G. REID.
WALTER B. ALLISON.